J. F. G. SMITH.
STEERING WHEEL LOCK.
APPLICATION FILED AUG. 21, 1914. RENEWED DEC. 9, 1916.
1,213,288. Patented Jan. 23, 1917.
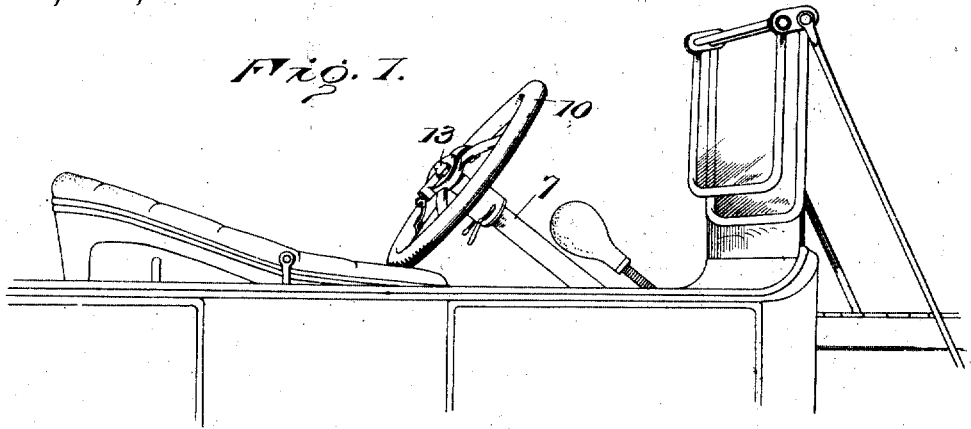
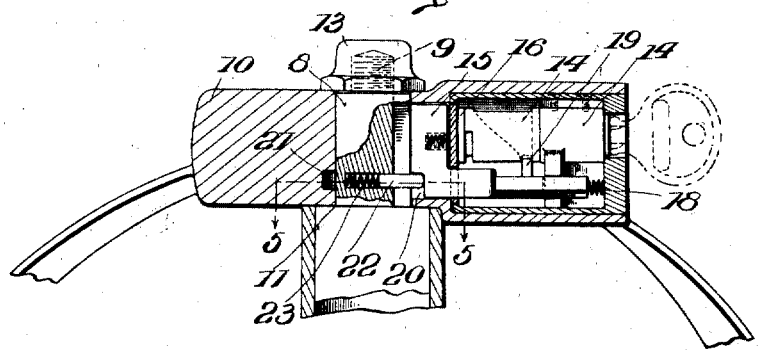
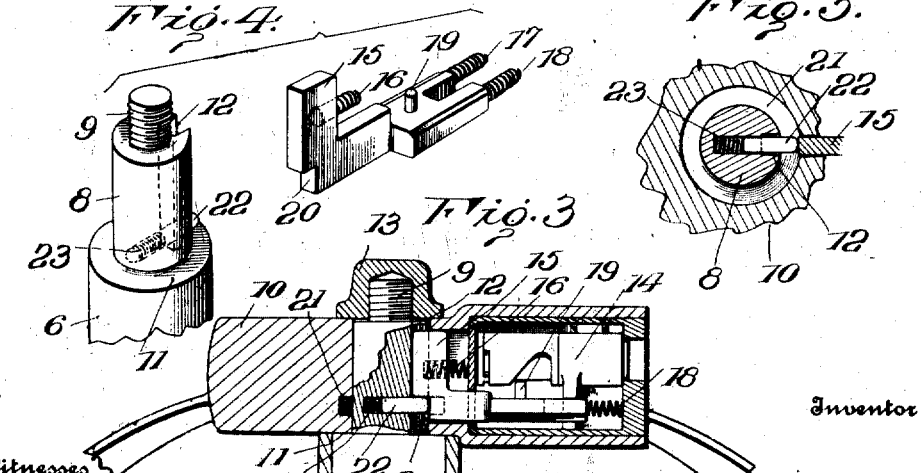
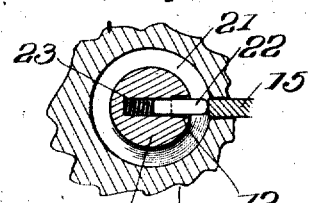
Witnesses
Inventor
J. F. G. Smith

UNITED STATES PATENT OFFICE.

JOHN F. G. SMITH, OF WASHINGTON, DISTRICT OF COLUMBIA.

STEERING-WHEEL LOCK.

1,213,288.  Specification of Letters Patent.  Patented Jan. 23, 1917.

Application filed August 21, 1914, Serial No. 857,918. Renewed December 9, 1916. Serial No. 136,093.

*To all whom it may concern:*

Be it known that I, JOHN F. G. SMITH, a citizen of the United States, residing at Washington, District of Columbia, have invented certain new and useful Improvements in Steering-Wheel Locks, of which the following is a specification.

This invention relates to means for locking the steering wheels of automobiles or the like, in order to prevent the unauthorized use of a machine of which the steering mechanism is a part.

The primary object of this invention is to provide a device of the character set forth which may be utilized to render the steering mechanism operative or inoperative at the will of the holder of the key to the locking mechanism coöperating therewith.

A further object is to provide means whereby the steering wheel may be placed in or out of operative connection with the steering post in order to prevent the turning of the said post by unauthorized persons.

With these and other objects in view this invention consists in the peculiar combination and arrangement of the various parts of a steering wheel lock as hereinafter described and more particularly pointed out in the appended claims.

Referring to the drawings forming a portion of this specification and in which similar reference characters indicate similar parts wherever used, Figure 1 is a broken perspective view showing the present invention as applied to an automobile steering wheel. Fig. 2 is a transverse section showing the parts in a position to prevent unauthorized use of the machine. Fig. 3 is a transverse section showing the steering wheel and the steering post in operable engagement. Fig. 4 is a detail perspective of several of the coöperating parts, and Fig. 5 is a section on line 5—5 of Fig. 2.

The numeral 6 designates the steering post of the usual type, surrounded by a column 7, and provided with a reduced portion 8 which is in turn provided with a second reduced portion 9 screw threaded for a purpose hereinafter described. The reduced portion 8 engages an aperture in the steering wheel 10, which latter rests upon the shoulder 11 formed by the reduced portion 8. In the portion 8 is a slot or key way 12, and engaging the screw threaded portion 9 is a cap nut 13 which screws down tightly against the upper face of the wheel 10.

All of the above construction as described is the standard equipment of the present type of popular light car. As now constructed however the steering wheel 10 is splined to the shaft 6 by means of a spline or key engaging the slot 12 and a corresponding slot in the wheel, so that the wheel is at all times fast upon the steering post.

In applying the present invention to the steering mechanism the spline or key is dispensed with and a standard cam action lock, represented by the numeral 14, is inserted in a bore formed on the hub of the steering wheel. This lock is provided with a special form of bolt 15 adapted to be pressed forward by means of springs 16, 17 and 18, and to be retracted by the cam of the lock 14 working upon a pin 19 against the thrust action of the springs 16, 17 and 18. The lower end of the bolt 15 is provided with a notch 20 which corresponds in dimensions with an annular slot 21 cut in the periphery of the aperture of the steering wheel hub adjacent the lower face.

Mounted in the portion 8 of the post 6 and extending into the slot 12 is a spring pressed pin 22, the spring being shown at 23.

In assembling the mechanism the wheel is placed upon the portion 8 in such a manner as to permit the pin 22 to engage the slot 21 and to be forced outwardly therein by the spring 23, the notch 20 of the bolt 15 forming a continuation of the annular slot 21. The cap nut 13 is screwed upon the screw threaded portion 9 to hold the wheel 10 upon the shaft.

The operation of the device is as follows: When it is desired to steer the car the lock 14 is actuated by means of the proper key to throw the bolt 15 forward whereupon it will engage the slot 12 in the steering post 6 and form an operable connection between the steering wheel and the steering post to steer the machine. When it is desired to prevent the unauthorized use of the car the lock is operated by the proper key to retract the bolt 15 from engagement with the slot 12, thus permitting the wheel 10 to turn freely with relation to the shaft 6. In this position should an effort be made to remove the steering wheel from the shaft 6 the pin 22 engaging the slot 21 will prevent any upward movement of the wheel 10. Should it become necessary however to remove the wheel 10 from the shaft 6, from wreckage or other cause, the wheel is rotated until the pin 22 registers with the notch 20 of the bolt 15, when the lock is operated to force the bolt outwardly which will force the pin 22 back against the action of the spring 23 to the position shown in Fig. 2 when the cap 13 being removed the wheel 10 may be lifted off the post.

While the present invention has been described as applicable to automobiles, it is evident that the mechanism herein described may be applied to any steering wheel wherever used, as for instance motor boats or the like.

As many changes could be made in the above construction and many apparently widely different embodiments of the invention could be made, without departing from the scope thereof, I intend that all matter contained in the above description or shown in the accompanying drawing shall be interpreted as illustrative and not in a limiting sense.

I claim:

1. In a steering wheel lock, in combination, a steering post formed with a slot therein, a steering wheel, means carried by said steering wheel adapted to be engaged with or disengaged from said slot whereby to place said parts in operative or inoperative relation and means controlled by said engaging means to hold the wheel from vertical movement on the post.

2. In a steering wheel lock, in combination, a steering post formed with a slot therein, a steering wheel, means carried by said steering wheel adapted to be engaged with or disengaged from said slot whereby to place said parts in operative or inoperative relation, and means carried by said post and controlled by said first mentioned means adapted to engage said wheel when the latter is in inoperative relation with the post to prevent the removal of the wheel from the post.

3. In a steering wheel lock, in combination, a steering post formed with a slot therein, a wheel mounted on said post, key-controlled means carried by said wheel adapted to engage with or disengage from said slot, means carried by said post adapted to engage said wheel when said key-controlled means is disengaged from said post, said wheel engaging means being actuated in the actuation of said key-controlled means, whereby to permit the removal of said wheel from the shaft.

4. In a steering wheel lock, in combination, a steering post having a vertically extending slot therein, a steering wheel adapted to be mounted over the slotted end of said post and provided adjacent the lower face of its hub portion with a circumferential recess, a spring-pressed member mounted adjacent the upper end of said post and having its outer end extending through the slotted portion thereof and into the circumferential recess of the wheel, a lock chamber extending from the hub portion of said wheel, a lock in said chamber provided with a bolt extending into the slot in the post and adapted to engage the spring-pressed member therein, whereby said bolt in its extended position is adapted to compress said spring-pressed member from out the circumferential recess in the wheel and to lock said wheel and post together, for the purpose set forth.

In testimony whereof I affix my signature in presence of two witnesses.

JOHN F. G. SMITH.

Witnesses:
F. L. BROWNE,
J. K. MOORE.